June 23, 1925.
C. R. SHORT
GEAR CUTTING MACHINE
Filed Dec. 10, 1917  2 Sheets-Sheet 1
1,543,031
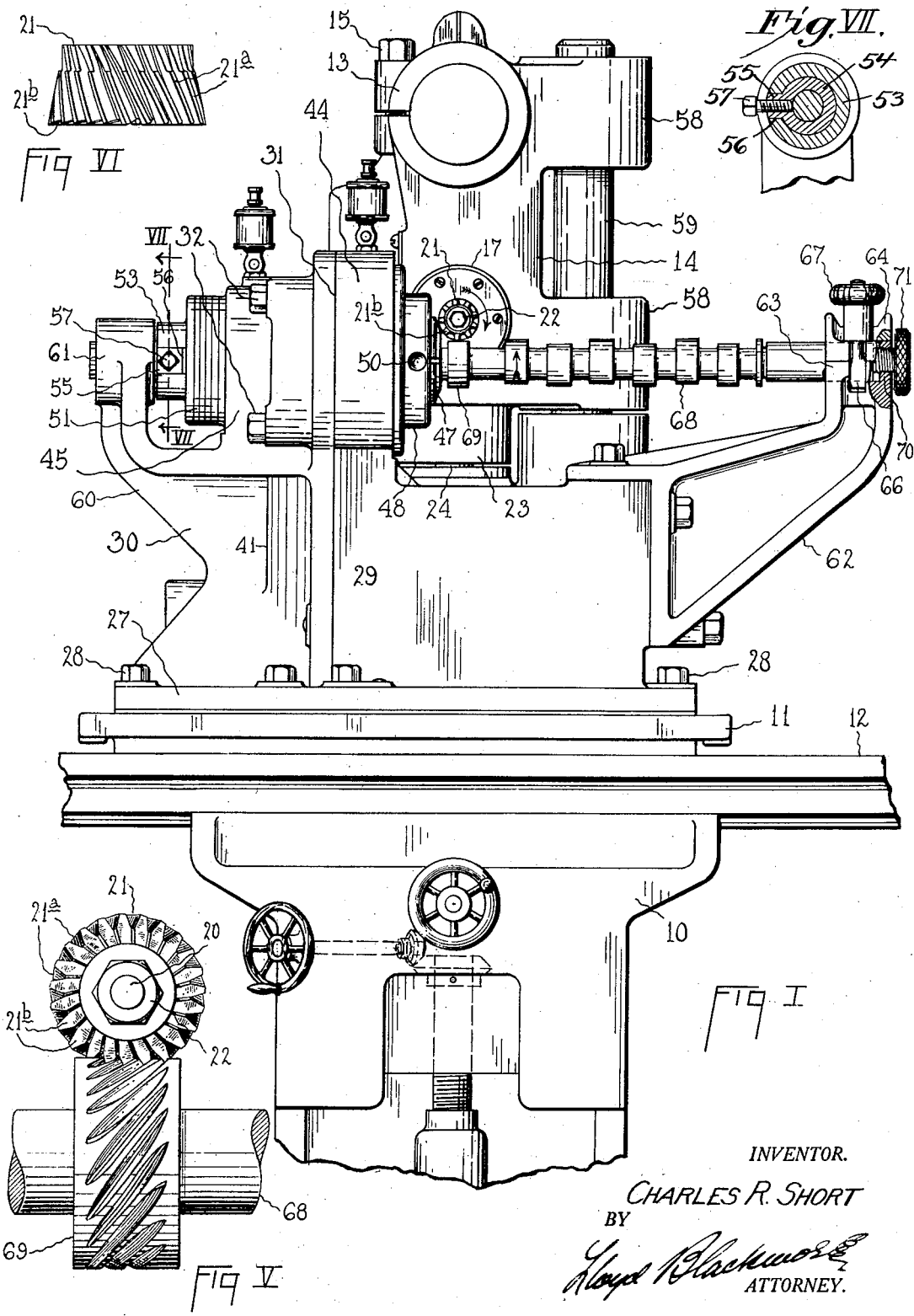
INVENTOR.
CHARLES R. SHORT
BY
Lloyd Blackmore
ATTORNEY.

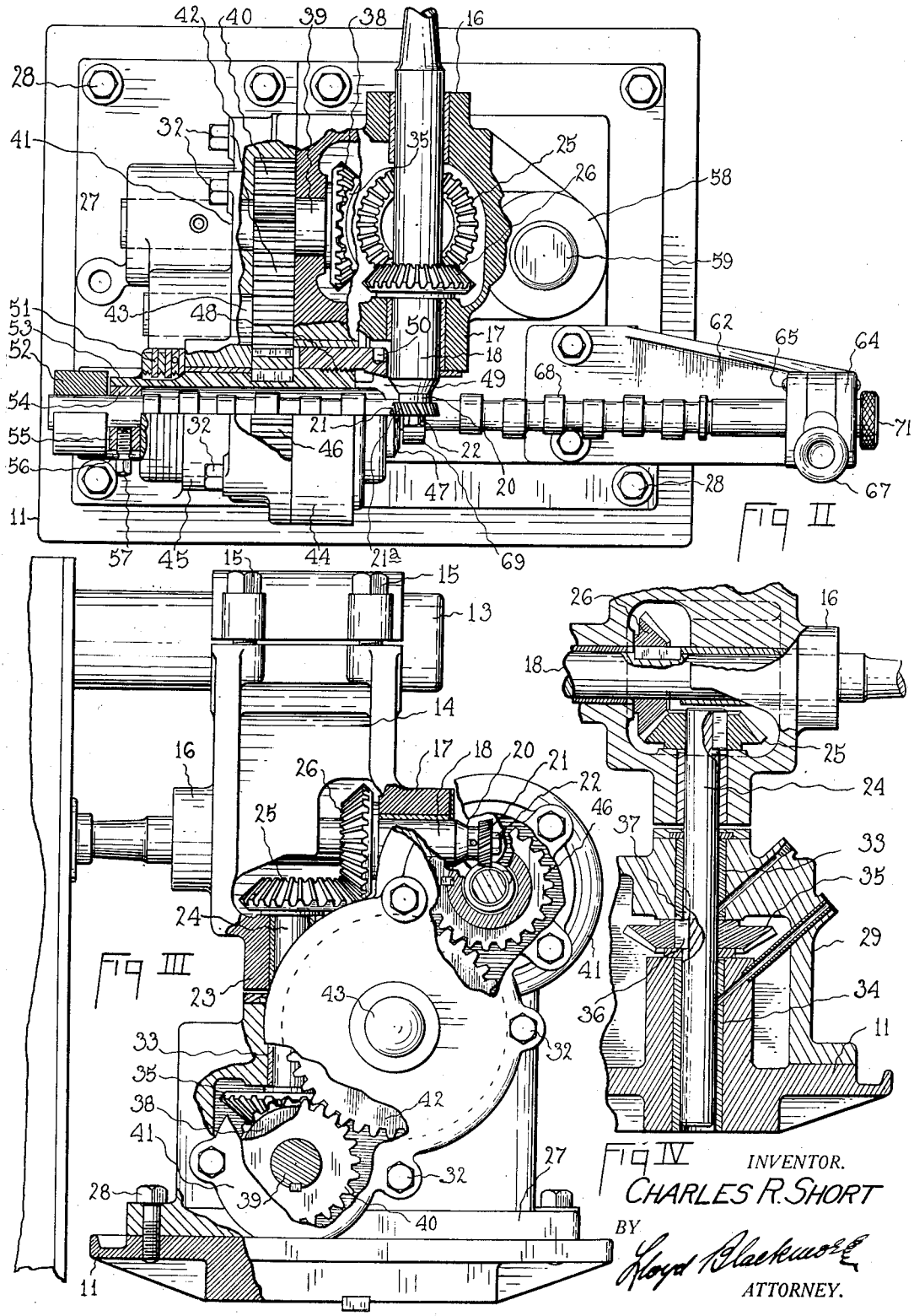

Patented June 23, 1925.

1,543,031

UNITED STATES PATENT OFFICE.

CHARLES R. SHORT, OF DETROIT, MICHIGAN, ASSIGNOR TO GENERAL MOTORS CORPORATION, OF DETROIT, MICHIGAN, A CORPORATION OF DELAWARE.

GEAR-CUTTING MACHINE.

Application filed December 10, 1917. Serial No. 206,441.

*To all whom it may concern:*

Be it known that I, CHARLES R. SHORT, a subject of the King of Great Britain, and resident of Detroit, Wayne County, State of Michigan, have invented certain new and useful Improvements in Gear-Cutting Machines, of which the following is a specification.

The invention relates to improvements in gear cutting machines, as described in the present specification and illustrated in the accompanying drawings that form part of the same.

One of the objects of the invention is to devise a gear cutting machine of simple and durable construction.

Another object of the invention is to devise a gear cutting machine which will be efficient and rapid in operation.

Another object of the invention is to devise a gear cutting machine which will cut and generate the teeth of a gear with a minimum number of movements.

Another object of the invention is to devise a gear cutting machine which will readily be understood and operated.

Another object of the invention is to devise a gear cutting machine having a cutter of simple and durable construction and requiring a minimum of adjustment.

Another object of the invention is to devise a gear cutting machine which may be readily evolved from a standard type of milling machine.

Another object of the invention is to devise a gear cutting machine which will cut continually while operating.

Another object of the invention is to devise a gear cutting machine in which the work will be firmly and accurately supported, and readily mounted or dismounted therefrom.

These and other objects will more clearly appear from the following descriptions taken in connection with the accompanying drawings, which form a part of this specification and in which:

Figure 1 is a front elevation of the machine.

Figure 2 is a plan view of the machine with parts of the standard, chuck and gear casing broken away.

Figure 3 is a side elevation of the upper part of the machine showing parts of the gear casing and bearings broken away.

Figure 4 is a vertical, fragmentary, sectional view of the bevel gear transmission from the reverse side of that shown in Figure 3.

Figure 5 is an enlarged detail view of the cutter end face and gear portion of a shaft as cut.

Figure 6 is a side view of the cutter as shown in Fig. 5.

Figure 7 is a sectional view on the line 7—7 of Figure 1.

Like numerals of reference indicate corresponding parts throughout the several views.

In the following specification, it will be understood that the machine as described is formed in part similar to a standard type of milling machine, but the particular form and arrangement thereof is in no manner so confined.

Referring to the drawings—10 is the standard of the machine, which is shown of a regulation milling machine type having the saddle 11 mounted on the knee 12, and the over arm 13 projecting outwardly therefrom adjacent the top, said over arm having the arbor bracket 14 clamped thereto, as by the bolts 15, and extending downwardly having the bearings 16 and 17 in which the arbor 18 is journaled, said arbor having a suitable drive mechanism connected therewith, and the reduced end 20 on which the cutter 21 is mounted and secured as by the nut 22.

The cutter 21 is of the face mill type, the teeth 21$^a$ being sharpened on the front face 21$^b$ and the receding due to the conical form of the cutter to the rear, and further being arranged in accordance with the angle of spiral of the gear to be cut, thus being of a peculiar type to have the end of each tooth the cutting face and contacting directly with the metal on the blank which is to be cut away to form the teeth.

The arbor bracket 14 further has the vertical bearing 23 at the bottom thereof in which the vertical shaft 24 is journaled, said shaft 24 having the bevel gear 25 fixedly mounted on the upper end thereof and meshing with the bevel gear 26 mounted on the shaft 18 immediately next the inner side of the bearing 17, the bracket 14 being recessed immediately next the inner side of bearing 17 and above the bearing 23 to accommodate said gears.

A fixture 27 is bolted to the saddle 11 of the machine as by the bolts 28 and is formed of the sections 29 and 30, the section 30, where it meets the section 29 as at 31, being enlarged to form a gear casing and secured to said section 29 as by the bolts 32. The arbor bracket 14 is further supported and held from vibration or displacement by the lateral lugs 58, having orifices therethrough in vertical alignment and through which extends the vertical stud post 59.

The shaft 24, hereinbefore referred to, extends downwardly through a bearing 33 in the section 29, and into a bearing 34 on the saddle 11, and has a bevel gear 35 mounted thereon between said bearings 33 and 34, the gear 35 being secured to the shaft 24 by a key 36 which is free to slide in the key-seat 37 in said shaft, whereby the saddle 11 and the section 29 may be adjusted vertically with the knee 12, as customary in milling machines, toward or away from the arbor bracket 14 in which the cutter arbor is journaled.

A train of gears is arranged for driving a work chuck 47 as hereinafter described, and comprises the bevel gear 38, meshing with the bevel gear 35 and fixedly mounted on the shaft 39 journaled in suitable bearings in the sections 29 and 30, the spur gear 40 also fixedly mounted on the shaft 39 and contained within the casing 41 formed with the section 30, and the spur idler gear 42 mounted on the stud shaft 43, suitably set in the section 30 of the fixture.

The chuck 47 is of barrel form and is mounted in journal bearings 44 and 45 formed in the sections 27 and 30, respectively, and has the spur gear 46 secured thereon within the casing 41 and meshing with the idler pinion 42.

The chuck 47 within the bearing 44 has the clamping ring 48 threaded thereon from the jaw end and wedging over the tapered chuck jaws 49, whereby said clamping ring may be screwed inwardly by inserting a bar in the orifices 50 to wedge the chuck jaws against the work inserted therein.

The chuck 47 is further provided with thrust bearing washers 51 at the end of the bearing 45 formed in the section 30, and the end 53 thereof is slotted at 56 to receive a collar 54 with an extension or dog lug 55 extending into the slot 56 and fitted with a set screw 57 to engage with the work if desired.

The machine, as hereinbefore described, is capable of having work secured in the chuck with a portion thereof extending under the cutter for operation, but to properly support a cam shaft 68 as shown in the drawings and having a portion 69 intermediate the length thereof and on which a spiral gear is to be cut, the section 30 of the fixture 27 has an arm 60 extending therefrom and formed with the journal bearing 61 in axial alignment with the chuck 47, and further the arm 62 is secured to the section 29 and has the end thereof formed with a journal bearing 63 to form a steady rest, said bearing 63 being split with the upper half 64 hinged as at 65 and clamped by the eye-bolt 66 and nut 67, the lower half 64 of the bearing 63 having the portion 70 extending into the journal and fitted with the knurled gauge screw 71 whereby the cam shaft 68, after it has been inserted into the chuck from the jaw end, may rest in the lower half of the journal 63 and the upper half be closed thereon with the gauge screw abutting the end of the shaft.

In the operation of the machine, the cam shaft is clamped tightly in the jaws of the chuck, and further by the set screw 57, if desired, the section of the cam shaft on which the spiral gear is to be cut being slightly below the bottom of the cutter teeth and the axis thereof in a plane with the end face of the cutter. The machine is then started and the cutter arbor will rotate the cutter and coincidentally the cam shaft, through the gear train connection as hereinbefore explained; the speed ratio of the cutter and cam shaft are identical with the speed ratio of the cam shaft and the gear with which it will be set to mesh after being finished, in fact, the cutter is a replica of the gear in regard to tooth pitch and profile. The knee of the machine is now raised by the means commonly employed in milling machines, and raises with it the saddle and fixture until the cam shaft gear portion is gradually fed against the cutter to the desired depth, and in so doing the end face portions of the cutter teeth will engage in succession with the cam shaft gear portion and quickly and accurately cut a spiral gear thereon.

The machine as described is very simple and can be operated by comparatively unskilled labor, as no adjustment is required after once the parts are set; that is, the end bearings are set for supporting the cam shaft in correct longitudinal position, the saddle is set to bring the end face of the cutter in the axial plane of the cam shaft, and the space between the fixture and the arbor bracket is determined whereby the upward feed of the blank into the cutter is correct.

Though I have described and will claim the preferred embodiment of my invention, it will be obvious to those skilled in the art that many modifications and changes may be within the scope of the appended claims.

Having thus described my invention, what I claim and desire to secure by Letters Patent is:

1. A gear cutting machine comprising a standard, a horizontal spindle supported on said standard, a face mill cutter carried at one end of said spindle, a table vertically adjustable on said standard, a barrel chuck horizontally mounted on said table and having the axis thereof in the plane of said cutter face, and means for rotating said spindle and said chuck.

2. A gear cutting machine comprising a standard, a cutter spindle rotatably supported on said standard, a face mill cutter carried at the outer end of said spindle, a table vertically adjustable on said standard and having a journal block extending upwardly therefrom, a barrel chuck rotatable in said journal block and having the axis thereof in the plane of the face of said cutter and adjacent thereto, and a gear train operatively connecting said chuck and said spindle.

3. A gear cutting machine comprising a spindle, a face mill cutter at one end of said spindle, a table adjustable toward the axis of said spindle and having a journal block thereon, a barrel chuck rotatable in said journal block and having adjustable jaws at one end adjacent said cutter and an end thrust bearing at the opposite end and its axis in the plane of the face of said cutter, and means for co-incidently rotating said chuck and said spindle.

4. A gear cutting machine comprising a spindle, a face mill cutter at one end of said spindle, a table adjustable toward the axis of said spindle and having a journal block thereon, a barrel chuck rotatable in said journal block and having adjustable jaws at one end adjacent said cutter and an end thrust bearing at the opposite end and its axis in the plane of the face of said cutter, a steady rest journal carried by said table at a distance from said chuck and in axial alignment therewith, and means for co-incidently rotating said chuck and said spindle.

5. A gear cutting machine comprising a spindle, a face mill cutter at one end of said spindle, a table adjustable toward the axis of said spindle and having a journal block thereon, a barrel chuck rotatable in said journal block and having adjustable jaws at one end adjacent said cutter and a stop collar restricting the internal bore at the opposite end and its axis in the plane of the face of said cutter, and means for co-incidently rotating said chuck and said spindle.

6. A gear cutting machine comprising a spindle, a face mill cutter at one end of said spindle, a table adjustable toward the axis of said spindle and having a journal block of said spindle and having a journal block thereon, with a stepped internal bore, a barrel chuck having a stepped outer periphery including a clamping device to fit said journal block and its axis in the plane of the face of said cutter, and means for co-incidently rotating said chuck and said spindle.

7. A gear cutting machine comprising a standard, a horizontal cutter spindle supported on said standard and having a face mill cutter at the outer end thereof, a vertical shaft suitably journalled and having a bevel gear connection at its upper end with said spindle, a horizontal shaft suitably journalled and having a bevel gear connection with said vertical shaft, and a chuck horizontally supported from said standard and having spur gear connection with said horizontal shaft.

8. A gear cutting machine comprising a standard, a horizontal cutter spindle supported on said standard and having a face mill cutter at the outer end thereof, a vertical shaft suitably journalled and having a bevel gear connection at its upper end with said spindle, a horizontal shaft suitably journalled and having a bevel gear connection with said vertical shaft, and a chuck horizontally supported from said standard with the axis thereof in the plane of the face of said cutter and having spur gear connection with said jack shaft.

9. A gear cutting machine comprising a standard, a cutter arm extending from said standard and having a bracket with a vertical bore therethrough, a cutter spindle horizontally journalled in said bracket, a cutter secured to the outer end of said spindle, a table vertically adjustable on said standard and having a vertical stud extending through the bore in said bracket, a chuck rotatably supported on said table and means for co-incidently rotating said chuck and said spindle.

In testimony whereof I affix my signature.

CHARLES R. SHORT.